(12) United States Patent
Soref et al.

(10) Patent No.: US 6,195,187 B1
(45) Date of Patent: Feb. 27, 2001

(54) WAVELENGTH-DIVISION MULTIPLEXED M×N×M CROSS-CONNECT SWITCH USING ACTIVE MICRORING RESONATORS

(75) Inventors: Richard A. Soref, Newton Centre; Brent E. Little, Boston, both of MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/111,004

(22) Filed: Jul. 7, 1998

(51) Int. Cl.[7] .............................. H04J 14/00; H04J 14/02
(52) U.S. Cl. ......................... 359/114; 359/117; 359/128
(58) Field of Search .................................. 359/117, 128, 359/139; 385/15, 14, 16, 17, 50

(56) References Cited

U.S. PATENT DOCUMENTS

| | | | | |
|---|---|---|---|---|
| 5,623,356 | 4/1997 | Kaminow et al. | ................... | 359/123 |
| 6,078,605 | * 6/2000 | Little et al. | ............................. | 372/94 |
| 6,078,704 | * 6/2000 | Bischel et al. | ............................ | 385/4 |
| 6,130,969 | * 10/2000 | Villeneuve et al. | .................... | 385/27 |

* cited by examiner

Primary Examiner—Jason Chan
Assistant Examiner—Chau M. Nguyen
(74) Attorney, Agent, or Firm—Robert L. Nathans; William G. Auton

(57) ABSTRACT

Large-scale switching array architectures for multiwavelength routing employ absorption-switched micro-ring resonator 2×2 switches at all optical cross-points of each of a plurality of series-connected waveguide crossbar matrix switches. The architecture eliminates detrimental waveguide crossovers. Two or four coupled micro-rings made from layered III-V or II-VI hetrostructure material can aid in maintaining cross-talk at very low levels while employing simple switch addressing methods.

47 Claims, 9 Drawing Sheets

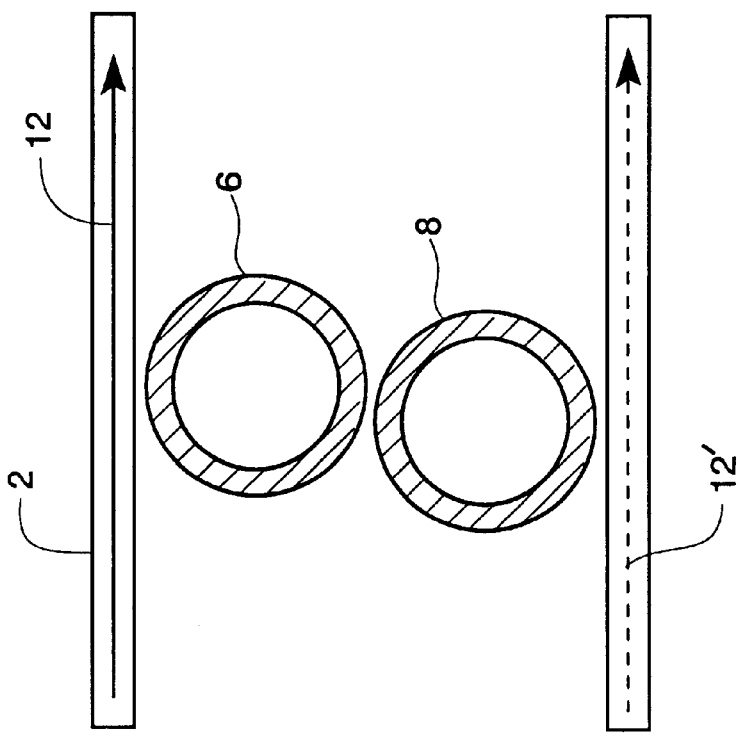
OFF state *Fig. 1a*
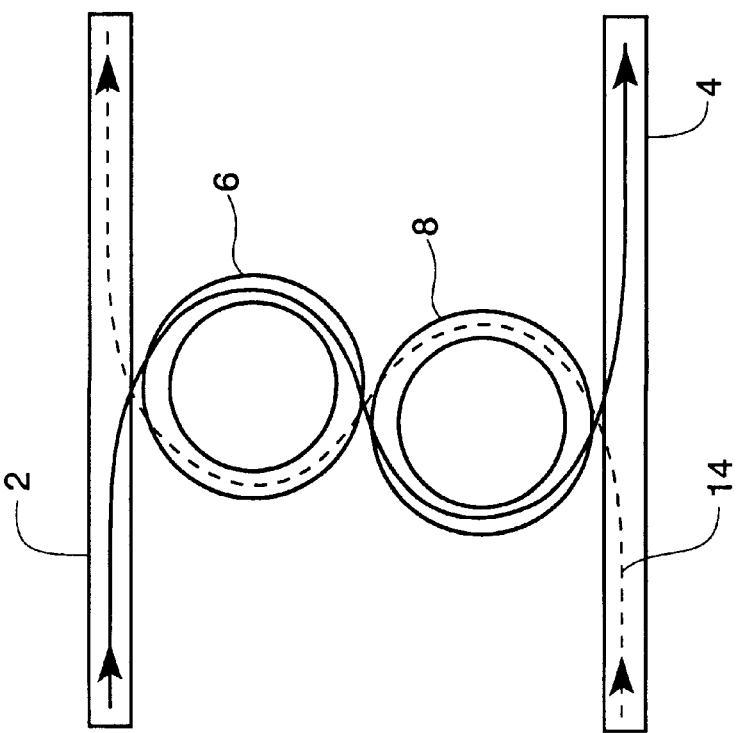
OFF state *Fig. 1b*

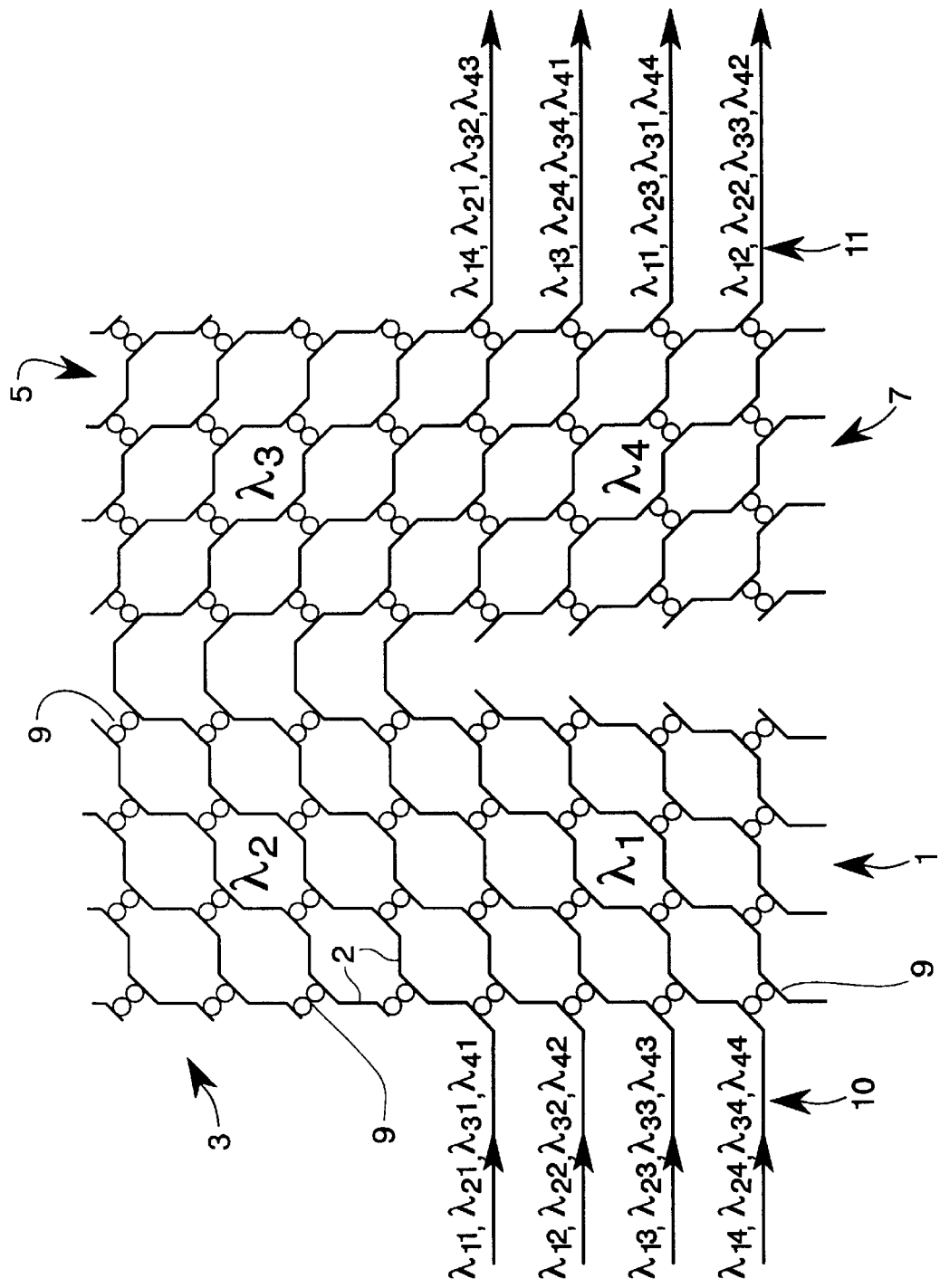

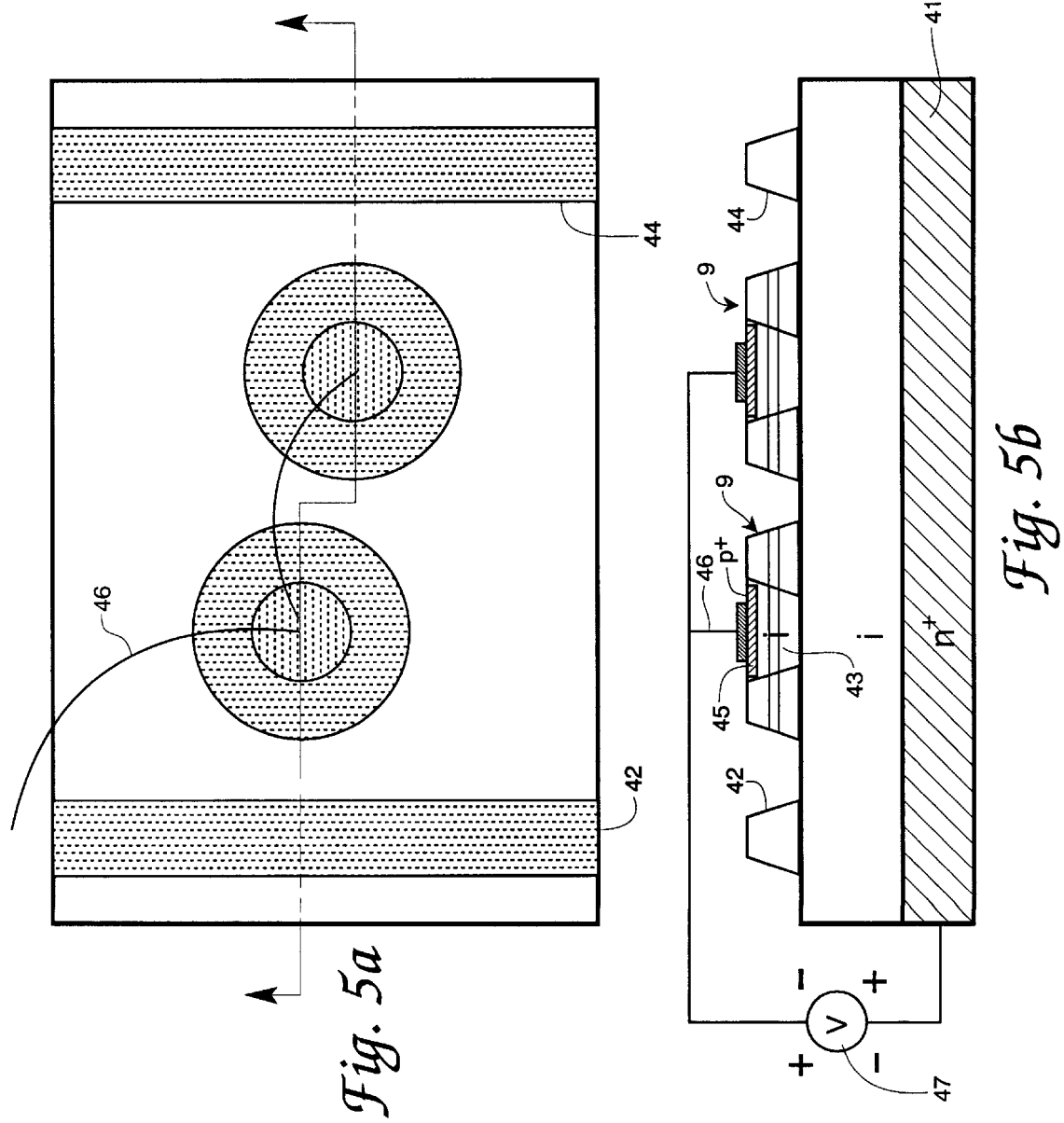

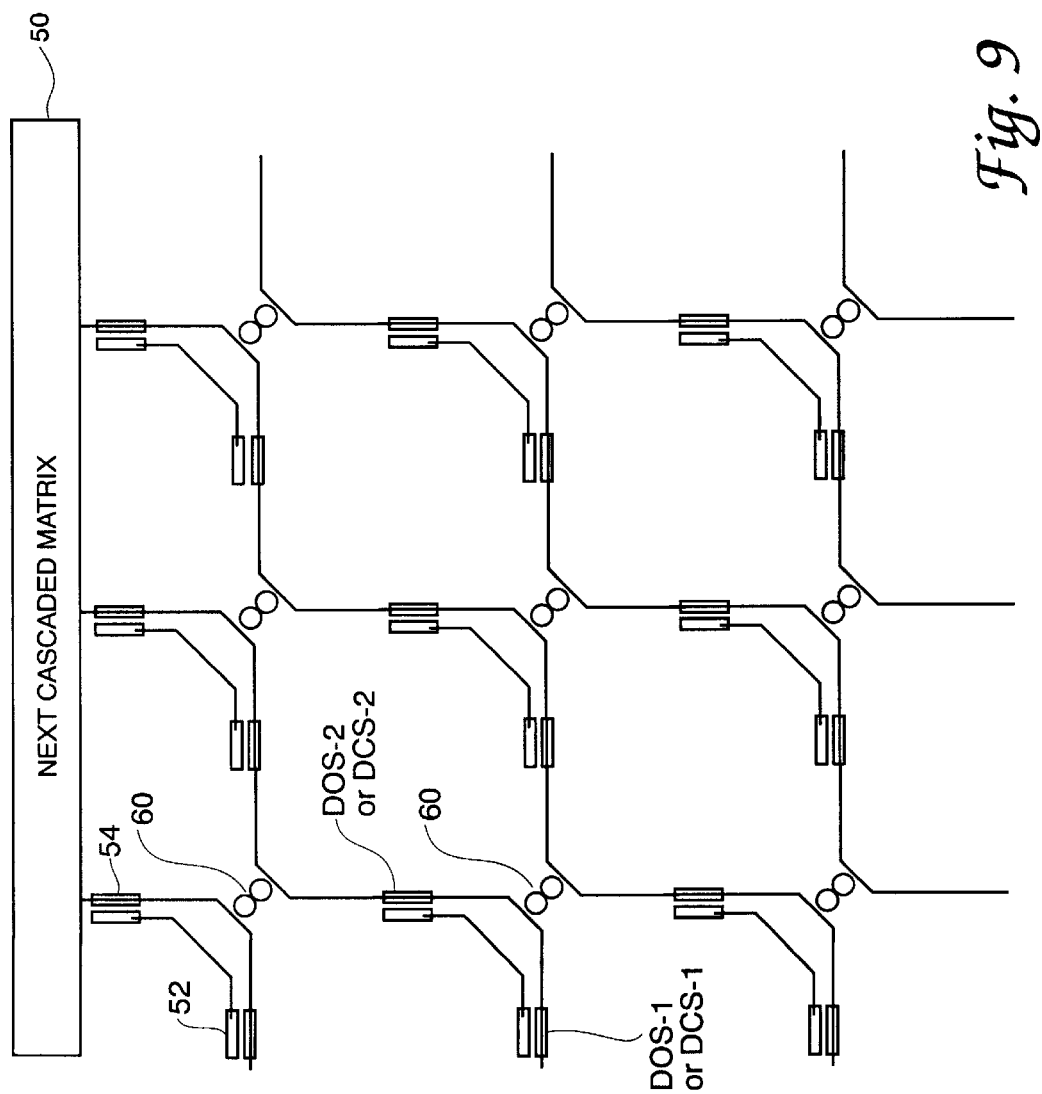

US 6,195,187 B1

WAVELENGTH-DIVISION MULTIPLEXED M×N×M CROSS-CONNECT SWITCH USING ACTIVE MICRORING RESONATORS

STATEMENT OF GOVERNMENT INTEREST

This invention may be made by or for the Government for governmental purposes without the payment of any royalty thereon.

BACKGROUND OF THE INVENTION

The present invention relates to the field of wavelength-division-multiplexed light-signal routing networks.

Dense wavelength-division multiplexing (WDM) is an important aspect of advanced long-distance fiber-optic communications networks, especially telecom and antenna remoting networks. Each of the several network fibers transports eight or more independent high-speed optical-wavelength-encoded signals. Voice/video/data signals are encoded on different, but closely spaced, wavelength "carriers" near 1550 nm or 1300 nm. A key component for signal routing and dynamic reconfiguration of the network is the electro-optical WDM crossconnect, an integrated optical switching component that interfaces with M fibers at its input and M fibers at its output. Prior art exists on such crossconnects; however, the prior-art thermooptic silica versions have large area and millisecond response times, the unamplified III-V semiconductor versions have crosstalk greater than −22 dB, and the fast LiNbO$_3$ versions require actuation voltages greater than 5 volts. There are unmet needs for smaller-area, lower-crosstalk, planar, nonblocking electrooptic crossconnects having restoration times less than one nanosecond and switching voltages less than 5 volts. Other unmet needs of such systems relate to low cost, low optical insertion loss, and being monolithic with commercial electronics. The crossconnect components in this invention offer most of these desired features in one compact chip.

BRIEF SUMMARY OF PREFERRED EMBODIMENTS OF THE INVENTION

This invention presents novel architectures for integrated-optic M×N×M crossconnect micro-switches. Arrays of active lightwave micro-resonators such as microring resonators on a semiconductor chip provide dense WDM switching in a compact, planar, low-voltage, high-speed geometry. The rings are changed from a low-absorption to high-absorption state by an applied field in III-V or II-VI electroabsorptive material, or the rings transform from a high-absorption state to a low-absorption state by injected current in III-V or II-VI electro-transparency material. Analysis indicates that the crossconnect routing network is scaleable to 8×8×8 with more than 48 dB signal-to-crosstalk ratio.

This invention presents new architectures for low-voltage, low-crosstalk, strictly nonblocking M×N×M crossconnect WDM routing networks intended for monolithic integration on one semiconductor chip. The routing network is based upon arrays of active microring resonators coupled to a novel network of single-mode channel waveguides. This invention exploits a unique feature of the resonant rings— switching induced by changed absorption in the rings, rather than by index changes. The expected restoration time of the active rings is <1 ns. Two novel approaches to switching, electro-absorptive and electro-transparent rings, are described. This crossconnect's architecture has many advantages: it is scaleable, contains no waveguide intersections (crossings), has simple addressing, and packs hundreds or thousands of devices in an area much less than 1 cm$^2$ because the waveguides have high index contrast. The chip offers convenient end-fire coupling to in-line arrays of optical fibers via tapered waveguides on the chip. Via waveguides, the crossconnect couples simply and monolithically to on-chip laser diodes and photodetectors.

The presently preferred wavelength division routing network features a plurality of cascaded optical matrix switches coupled together in optical series, each matrix including a number of light waveguides and an array of active microring resonators (AMR) two-by-two cross-point light-switching elements associated with cross-points between non-intersecting light waveguide portions, and wherein the AMR light-switching elements of each matrix are responsive to a particular wavelength of light assigned to a particular matrix of the network and unresponsive to wavelengths assigned to other matrices of the network. Switching element control circuitry is provided for causing selected AMR light-switching elements to assume a cross state for switching light across associated cross-points, or a bar state for forwarding light without traversing cross-points. Alternative switching elements include passive lightwave resonators such as microrings or microdisks with associated pairs of active electro-optic index-changing switching members which can selectively apply incoming light signals to selected resonators or alternatively, shunt incoming light signals around the resonators.

BRIEF DESCRIPTION OF THE DRAWINGS

Other features of the invention will become more apparent upon study of the detailed written description, taken in conjunction with the following drawings:

FIGS. 1a and 1b. Two switching states of 2-microring 2×2 electro-absorption switch for resonant-wavelength light.

FIG. 2. 4×4×4 WDM crossconnect network based on four cascaded 4×4 crossbar matrices that use active 2-microring resonators.

FIGS. 5a and 5b. Top view and cross-section side view, taken through sectional line A—A, of dual-microdisk-resonator 2×2 crosspoint switch using electroabsorptive or electrotransparent p-i-n diode structure.

FIG. 9. Architecture of 3×3 crossbar made from FIG. 8 crosspoints, a matrix resonant at $\lambda_1$ for incorporation into a cascade of $\lambda_1 \ldots \lambda_N$ matrices.

DETAILED DESCRIPTION OF PREFERRED EMBODIMENTS OF THE INVENTION

Figure 3:
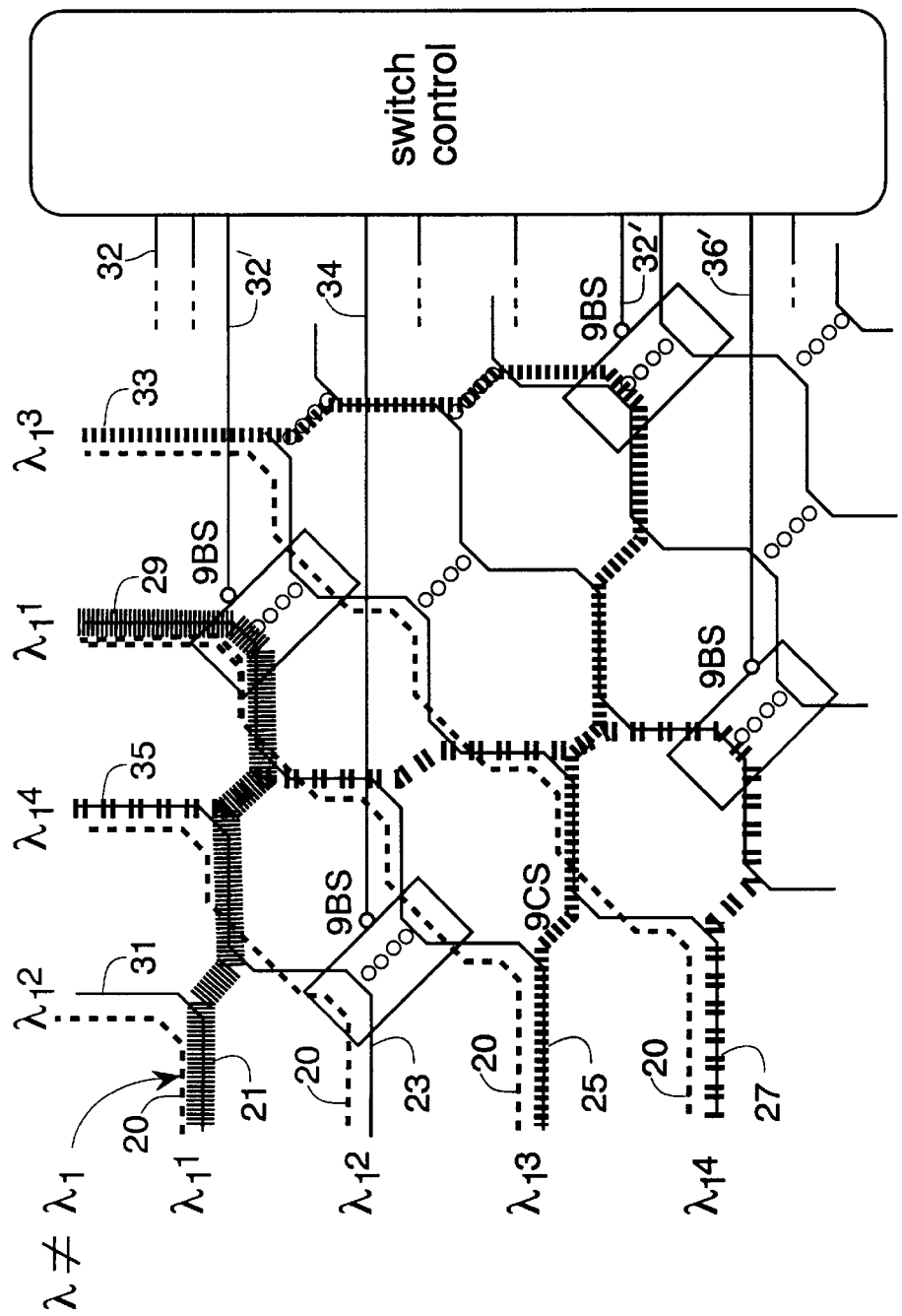
FIG. 3. Paths of resonant and non-resonant optical signals in an addressed 4×4 crossbar switch made from 4-microring 2×2 switches.

A recent paper on wavelength routing with waveguided microring resonators showed that one or more microrings of electroabsorptive (EA) material coupled to two straight semiconductor side-channel waveguides could operate as a 2×2 "crosspoint switch" when the rings were switched from a low-absorption state to a high-absorption state [B. E. Little, H. A. Haus, J. S. Foresi, L. C. Kimerling, E. P. Ippen, and D. J. Ripin, "Wavelength switching and routing using absorption and resonance", *IEEE Photon Technol. Lett.*, vol. 10, pp 816–819, June 1998]. Such rings would be made of layered III-V or II-V semiconductor heterostructure material. FIGS. 1*a* and 1*b* show the multiple-ring switching element used as the individual crosspoint within our proposed M×N×M architecture. We selected the 2-ring crosspoint switch because switched light travels in the same direction as the input light, not in the reverse direction as it does in a one-ring device. The optical passband can be tailored in the 2-ring case using coupling-coefficient adjustment and other techniques specified in section IV of B. E. Little, et al, *IEEE J. of Lightwave Technology*, vol. 15, pp 998–1005, June 1997. This invention also may also employ 4-ring and 6-ring 2×2 crosspoint switching elements, which have better crosstalk suppression than 2-ring elements but are more complex. We begin our discussion with the electro absorption mechanism; electro-transparency is discussed later. The cross state is the low-absorption condition of the dual rings or the electrical OFF state shown in FIG. 1*a*. Here, one of the many input wavelengths is resonant and crosses over from the upper waveguide portion 2 to the lower waveguide portion 4, via rings 6 and 8. Resonant wave signal 14 in the lower waveguide 4 would also cross-over or traverse the switch through the cores to the upper waveguide 2 as shown. Another aspect of the OFF state is that all of the non-resonant wavelengths are in the straight-through bar state, indicated in FIG. 1*b*. Figuratively speaking, the switches are "non-existent" with respect to non-resonant wavelengths which never cross over or traverse the cores. In the high-absorption condition (electrical ON state), a bar state exists for the resonant-wavelength signal which propagates in its original waveguide. Thus in the bar state, a light beam 12 would continue to pass through the upper waveguide portion 2 as indicated by arrow 12. At the same time, all other wavelengths are in the bar state and pass through the switch in the manner of beams 12 and 12' of FIG. 1*b*. The literature on EA modulators suggests that the FIG. 1 switching voltage will be ~3 V with a ~0.1 ns switching time [M. Ishizaka, M. Yamaguchi, J. Shimizu and K. Komatsu, "Transmission capability of a 10 Gb/s electroabsorption modulator integrated DFB laser using the offset bias chirp reduction technique", *IEEE Photon Technol. Lett.*, vol. 9, pp 162–1630, December 1997] [See also F. Devaux, A. Ougazzaden, F. Huet and M. Carre, "Lossless InAsP-InGaP modulator at 1.3 μm for optical conversion of radio signals up to 40 GHz", *IEEE Photon Technol. Lett.*, vol. 9, pp 931–933, July 1997]. A recent paper demonstrated that individual rings in FIGS. 1*a* and 1*b* can have a radius as small as 3 microns, Little, J. S. Foresi, G. Steinmeyer, E. Thoen, S. Chu, H. A. Haus, E. P. Ippen, L. C. Kimerling and W. Greene, "Ultra-compact $Si/SiO_2$ microring resonator optical channel dropping filters", *IEEE Photon Technol. Lett.*, vol 10, pp 549–552, April 1998], a result based upon a high index difference between the waveguide's core and cladding—an index contrast that is attainable in III-V waveguides such as GaAs/AlGaAs upon $AlO_x$.

We consider an M×N×M crossconnect, where M is the number of fibers and N is the number of distinct wavelengths propagating in fiber. Our preferred design provides a group of N M×M crossbar matrix switches connected optically in cascade. FIG. 2 shows the integrated-optic layout of the M=4, N=4 crossconnect WDM routing network utilizing four active crossbar matrices. Each 4×4 matrix, comprised of 16 plural-ring 2×2 switches, is resonant at only one of the four input wavelengths $\lambda_1 \ldots \lambda_4$. For multi-quantum-well (MQW) electroabsorbers, this would require a slightly different bandgap ($\Delta E_g$~1 meV) in each matrix area. One way to do this is to construct all matrices with the narrowest-bandgap MQW layering. Then, selective-area quantum-well intermixing (vacancy induced or impurity induced) would be performed successively in N-1 matrices by implantation through a mask, thereby producing the desired blueshift of bandgap in each matrix. Of the $M^2$, e.g. 16 crosspoints in each matrix, only M, e.g. 4, are addressed ON at any time; hence 16 crosspoints will be ON and 48 will be OFF in the series-connected matrix arrangement of FIG. 2, an addressing technique that minimizes power consumption. The label $\lambda_i j$ denotes a signal at wavelength i=1 ... N incident upon the input port j=1 ... M of the crossconnect network shown in FIG. 2.

In the wavelength division routing network of FIG. 2, four cascaded matrices 1, 3, 5, and 7 are coupled together in tandem, the network including a number of input light waveguides 10 and output waveguides 11, together with an arrays of active microring resonantor (AMR) two-by-two cross-point light-switching elements 9 associated with cross-points between non-intersecting light waveguide portions. The AMR switching elements 9 of each array are responsive to a particular wavelength of light assigned to a particular matrix of the network and unresponsive to other wavelengths assigned to other matrices of the network. Switching element control circuitry 30 shown in FIG. 3 is also provided for causing selected AMR light-switching elements 9 to assume a cross state for switching light across associated cross-points, or a bar state for forwarding light without traversing cross-points.

FIG. 3 illustrates the optical routing in the first matrix 1 of FIG. 2 which is resonant at $\lambda_1$. Because the optical crosstalk of a 4-ring 2×2 switch is much lower than that of a 2-ring switch [B. E. Little, H. A. Haus, supra] we have shown the presently preferred 4-ring switch to indicate how a low-crosstalk matrix would be constructed. Looking first at the four $\lambda_1$ inputs 21, 23, 25 and 27, we see how the four ON crosspoints at four presently ON bar state switches 9BS route inputs 1, 2, 3, 4 to the 90° output channels in a particular rearrangement 3, 1, 4, 2. Those outputs are connected as inputs to the second $\lambda_2$ matrix 3 of FIG. 2. In the first matrix, twelve non-resonant input signals remain: four at $\lambda_2$, four at $\lambda_3$ and four at $\lambda_4$. Their paths are indicated by the dashed lines 20 designated $\lambda \neq \lambda_1$. We see that these signals travel along diagonal paths through each matrix, and that the spatial arrangement of non-resonant signals is preserved, and importantly, that resonant signals do not contend with non-resonant signals. Since the first matrix of FIG. 3 has switches responsive only to wavelength $\lambda_1$, light of other wavelengths will not cross over any crosspoints as shown by the dashed lines 20. The switches are simply not responsive to these other wavelengths. The $\lambda_1$ signals in the present example traverse the paths indicated by the non-dashed lines in FIG. 3. Electrical switch control circuit means 30 is connected to all 16 of the switches via leads 32. Four leads 32', 34, 34', and 36' in this example cause four switching elements 9BS to presently assume the ON bar state of FIG. 1*b* described above. In contrast, twelve switches 9CS coupled to twelve control leads 32, not all being shown, are in the OFF cross state of FIG. 1*a* to cause the $\lambda_1$ signals to traverse the switches as shown. The process indicated by FIG. 3 is repeated in the next N-1 cascaded matrices where the rearranged and unarranged signals are passed forward. As mentioned earlier, four of the sixteen switches in each matrix are ON which beneficially minimizes power supply requirements and undesireable heat production.

Besides FIG. 2, there are other feasible architectures for our resonant microring M×N×N crossconnects, including the parallel-matrix reconfigurable-WDM architecture of Brackett [FIG. 1.4, C. A. Brackett, "Multiwavelength switching and interconnection networks" in *Photonics in Switching, vol. II*, J. E. Midwinter, Editor, Academic Press, San Diego (1993), page 1] and the M×M *Clos and Benes architectures* discussed by H. S. Hinton, J. R. Erickson, T. J. Cloonan, and G. W. Rogers, "Space division switching", ibid, page 119. However, each of those architectures contains an M-dependent number of waveguide crossings when the AMR crossconnect is implemented in one plane. Since the typical semiconductor crossing introduces −40 to −30 dB of optical crosstalk, each architecture will have appreciably higher levels of crosstalk levels than that of FIG. 2. Regarding crosstalk, those in-plane architectures are not as good as that in FIG. 2, and so we have elected not to illustrate them here. In the parallel-matrix architecture, a lower-crosstalk alternative is the 3-dimensionally integrated crossconnect in which the ring-based matrix switches, wavelength-division multiplexers and wavelength-division demultiplexers are stacked and coupled in parallel planes. Because integrated-optics researchers are making progress today towards 3D optical integration in multi-level semiconductor structures, it may soon be feasible to build 3D Clos, Benes, and parallel-matrix switching arrays that eliminate all in-plane waveguide crossovers. Then, we would be able to contruct ultralow crosstalk AMR crossconnects in the Clos, Benes and parallel architectures.

Figure 4:
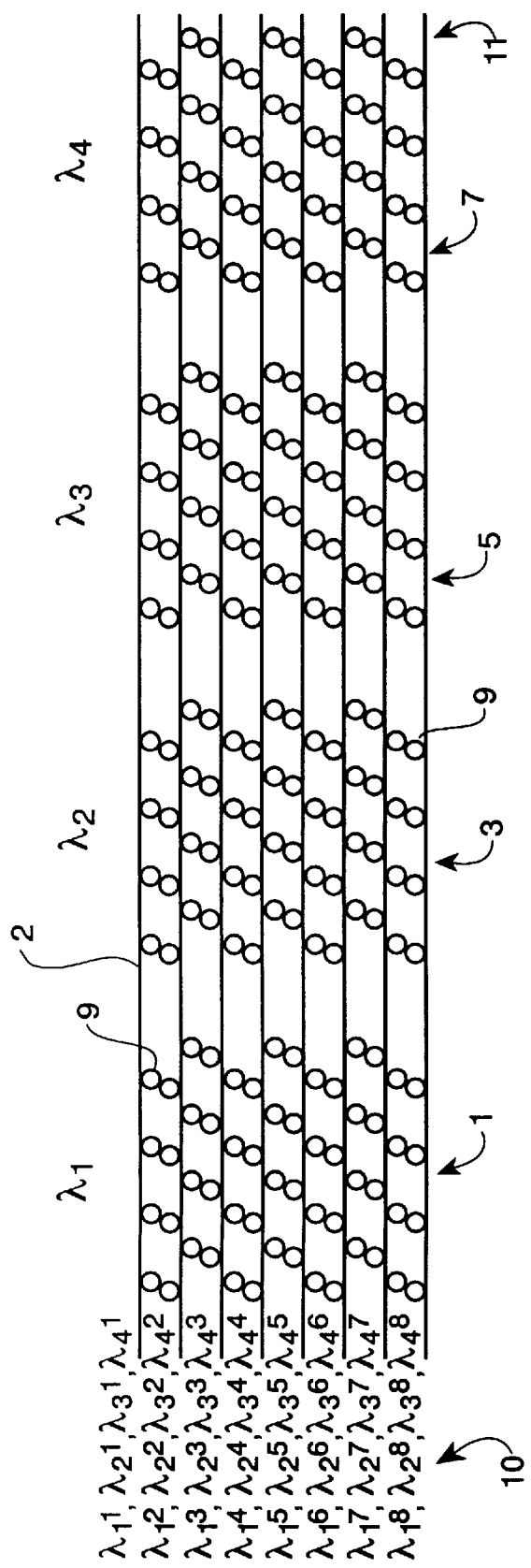
FIG. 4. Architecture of 8×4×8 active microring crossconnect using four cascaded permutation matrix switches.

Returning to planar microring M×N×Ms, we note that there is another active microring architecture—the permutation-matrix—that has no waveguide crossings. This novel architecture is illustrated in FIG. 4. As before, 2×2 crosspoint microring switches 9 can light couple a pair of waveguide portions 2 together. Permutation matrices 1, 3, 5, and 7 are also cascaded in an "optical series" arrangement as before. Although this crossconnect is expected to function well, it has two problems: the addressing algorithm for the ensemble of 2×2 switches is more complex than that of FIG. 2, and the optical insertion loss of FIG. 4 is larger than that of FIG. 2.

In all embodiments, the switching element control circuitry applies a strong electric field (such as 5 volts per micron) to the layered microring resonators to produce electroabsorption, or injects a moderately large current density into the resonators (such as 200 Amperes per $cm^2$) to produce electrotransparency. Both objectives can be reached by incorporating the resonators in a p-i-n diode structure wherein the substrate is doped n+, the III-V quantum well layers are intrinsic, and the resonators are capped with a p+ layer in the manner discussed below. If the electrical contact to each active ring resonator were placed directly on top of the guided-mode region, causing a strong overlap of mode and contact, then there would be guided-mode attenuation due to metal-like loading of the ring-guide. To alleviate this contact problem, we have designed a microdisk resonator that is optically equivalent to the microring resonator. The microdisk has a more favorable contact geometry. The electrical p+ contact layer is placed in the center of the microdisk where it does not directly overlap the "peripheral" optical guided mode. Yet, the center-disk contact produces strong fringing fields and strong fringing currents that do overlap the guided mode significantly, as desired for actuation of the resonator. This is illustrated in the top view of FIG. 5a and in the cross-section side view of FIG. 5b which show straight waveguides 42 and 44 coupled to two microdisk resonators 9. The center disk 45 is a p+ region, and the substrate 41 is n+. Metallic air-bridges 46 for connection to the electrical source 47 are seen in FIG. 5a. The p-i-n arrangement has two uses: during reverse bias (−,+) applied by electrical source 47 a large EA field appears in the peripheral intrinsic region 43; whereas, during forward bias (+,−) alternatively applied by source 47, the desired ET current is injected into the peripheral i-region.

The microdisk resonator is well-known in the art of microcavity lasers and there are many papers in the literature about such lasers. However, what is not well known is the electrically controlled optical-switching aspect of microdisks. In FIG. 5, we couple microdisk resonators 9 to other microdisks and to a pair of straight side-channel waveguides 44 for the purpose of optical switching. This is novel. The optical equivalence between the microdisk and microring resonator is found from an optical ray analysis of the fundamental guided mode in each micro-resonator. Specifically, the fundamental high-Q mode of the microdisk is the "whispering gallery mode" [see for example the light-ray trajectories in FIG. 2 of Schwartz and Triandaf, paper ITuD3, OSA Integrated Photonics Research Conference, Victoria, Mar. 30, 1998], and the whispering trajectory of light rays is very similar to the ray pattern found in the fundamental mode of our annular high-Q annular microring resonators.

Now we analyze the optical insertion loss of the FIG. 2 switch starting with waveguide loss. The inherent factors are waveguide material loss and waveguide bending loss. To this loss, must be added fabrication-technology losses such as wall-roughness loss that occurs during waveguide etching.

The wavelength response of a representative 2-ring switch is shown in FIG. 5 of B. E. Little et al. This OFF state is the minimum loss state, typically <0.05 dB, as determined by residual absorption in the rings, assuming ideal waveguides. There is, however, loss in the ON state which is associated with the EA strength and the optical bandwidth of the 2-ring resonator. Each 2×2 in an M×M matrix could have a resonance bandwidth of 1 nm or less; thus each matrix in FIG. 2 could have a bandwidth of 1 nm or less if the laser wavelengths were stabilized to with 1 nm or less. In [B. E. Little, H. A. Haus, etc] the authors find a fundamental loss of 7% for 1-nm-band 2×2s at the 1550 nm wavelength (Q=1550), and 0.7% loss for 0.1 nm bands (Q=15,500).

The loss in FIG. 2 depends upon the number of resonant or non-resonant ON states encountered on an addressed path (the ON 2×2 is lossy at all wavelengths). Some paths have more ON states than others. If we trace a signal through the FIG. 2 crossconnect, we find that a resonant signal will encounter only one ON-state switch, while non-resonant light passes through a number of ON-state switches that ranges from one to M-1 in the other N-1 matrices. Tracing the paths in detail in FIG. 2, we find that the worst-case crossconnect loss in dB is (MN/2)*10 log T, where T is the optical transmission through an ON switch. Then, for the above example of 7% ON loss (T=0.93), we estimate a fundamental loss of 2.5 dB for the 4×4×4, 10.1 dB for the 8×8×8, and 20.2 dB for 8×16×8 or the 16×8×16. Several dB of waveguide loss would be added to these figures.

The optical crosstalk of a semiconductor crossconnect depends upon the number of waveguide crossings within its architecture because each intersection contributes crosstalk in the −40 to −30 dB range. It is highly significant that FIG. 2 has no crossovers. The crosstalk of an individual 2×2 in FIG. 2 depends upon the field-dependent absorption alpha of the microrings. If the 2-ring filter/switch has a 1-nm bandwidth, an ON-state EA strength of 2500 dB/cm (alpha= 729 cm$^{-1}$) gives a 30 dB signal-to-crosstalk ratio (SXR) at resonance according to [FIG. 3a of B. E. Little reference], a ratio independent of wavelength. Many heterostructure designs permit independent adjustment of alpha(ON) and alpha(OFF), allowing high SXR in the OFF state. If we adjust alpha(OFF) to 10 dB/cm, which appears realistic, then the OFF-state SXR per [FIG. 3b of B. E. Little reference] is 60 dB for the 2-ring switch and 100 dB for the 4-ring switch. Because the rings produce very high out-of-band rejection of non-resonant signals, we anticipate that non-resonant crosstalk will be less than −60 dB in both the ON and OFF states. To understand the crosstalk effect of resonant ON switches, we examine the addressed optical paths in FIG. 3 and find that each ON switch always has one "full strength" signal and one "low strength" signal at its two input ports, not two full strength signals. Also, the low strength signal is actually crosstalk that comes from an OFF-state switch. Consequently, at each ON location, the optical leakage contributed to the matrix is the product of the OFF and ON leakages. In other words, this crosstalk is 60 dB+30 dB=90 dB down in the present example (ON crosstalk is negligible). Crosstalk arises primarily from those locations where two resonant light signals cross through an OFF-state switch. Hence the total crosstalk is a sum of all the resonant OFF-state crosstalks encountered on any path in the M×N×M. In FIG. 2, we find at most M−1 resonant OFF crossings (first matrix) and no such crossings in the remaining N−1 matrices. Thus the maximum crosstalk power (M−1) times the OFF leakage, and is independent of N. Hence, for the above −60 dB example, we predict a crosstalk of −55.2 dB for the 4×4×4, −51.5 dB for the 8×8×8, and −48.2 dB for the 16×16×16. Crosstalk would be 40 dB lower than these values for crosspoints composed of four rings.

It may seem that the OFF-state crosstalk is completely determined by the OFF-state absorption, but this is not true. Even for fairly large values of OFF-state absorption, such as 20 dB/cm or 50 dB/cm, it is possible to reduce the OFF-state crosstalk down to near-ideal values. This is done with "coupling engineering", which means that the evanescent-wave coupling spaces between the rings and the straight side-channels are made unequal in such a way as to minimize crosstalk at the expense of a slight increase in insertion loss; a fraction of a dB.

Finally, we describe another practical electro-optic switching mechanism in waveguided III-V or II-VI semiconductor microrings, a mechanism we call electro-transparency (ET). This mechanism is optical gain induced in the microresonator by an the injected carriers associated with an electric current. In practice, it is not necessary to inject so strongly that gain is present. It is sufficient to reduce the initial absorption loss in the rings (or disks) to zero (optical transparency) or to a low loss. To attain gain via injection, the layered heterostructure could be comprised of bulk semiconductor material or it could contain quantum wells (as does EA material in some instances). For ET, the core of the ring waveguide has high optical absorption ~2500 dB/cm at zero current (this is the new OFF state). As current is applied to the resonant microrings, the absorption decreases toward 0 dB/cm. We would use a value of current that produces approximately 5 dB/cm of absorption as the new ON state of the rings. We chose the ~5 dB/cm state rather than complete 0 dB/cm transparency because the injection current requirement is smaller (less I$^2$R loss than at 0 dB/cm) and because the crosstalk can be engineered to be sufficiently low at a value such as 5 dB/cm. If the diameter of each ring were 6 $\mu$m, then the ON state current would be about 30 microamperes, and the current density would be about 200 amperes per square cm. So, in going from OFF to ON, the ET rings go from high to low absorption (not low to high, as in EA). An important requirement of the ET crossconnect is to couple all rings to a passive waveguide network that is optically transparent at the resonant wavelengths of the microrings (unlike the OFF rings which are not transparent). There are two ways to accomplish this: (1) construct the network waveguides out of a different alloy composition than the rings, with the passive guides having a higher bandgap than the rings. This can be done by selective-area epitaxy in which the waveguide alloy layers are grown first, and the modified-composition ring alloy layers are grown second in small reserved areas, or; (2) make the guides and rings from the same alloy material and then implant the guide material to make its bandgap wider than the ring bandgap. This blue-shifting operation can be done by slightly disordering the quantum-well regions in the network layered material by known disorder techniques such as implantation. The ET mechanism also allows for optical amplification of signals on the same semiconductor chip. For example, in an M×M matrix switch, in-line waveguided optical amplifiers can be situated in each of the M output waveguides. These amplifiers would be constructed, for example, in "untreated" waveguide segments whose composition was identical to the ring composition.

Figures 6A, 6B:
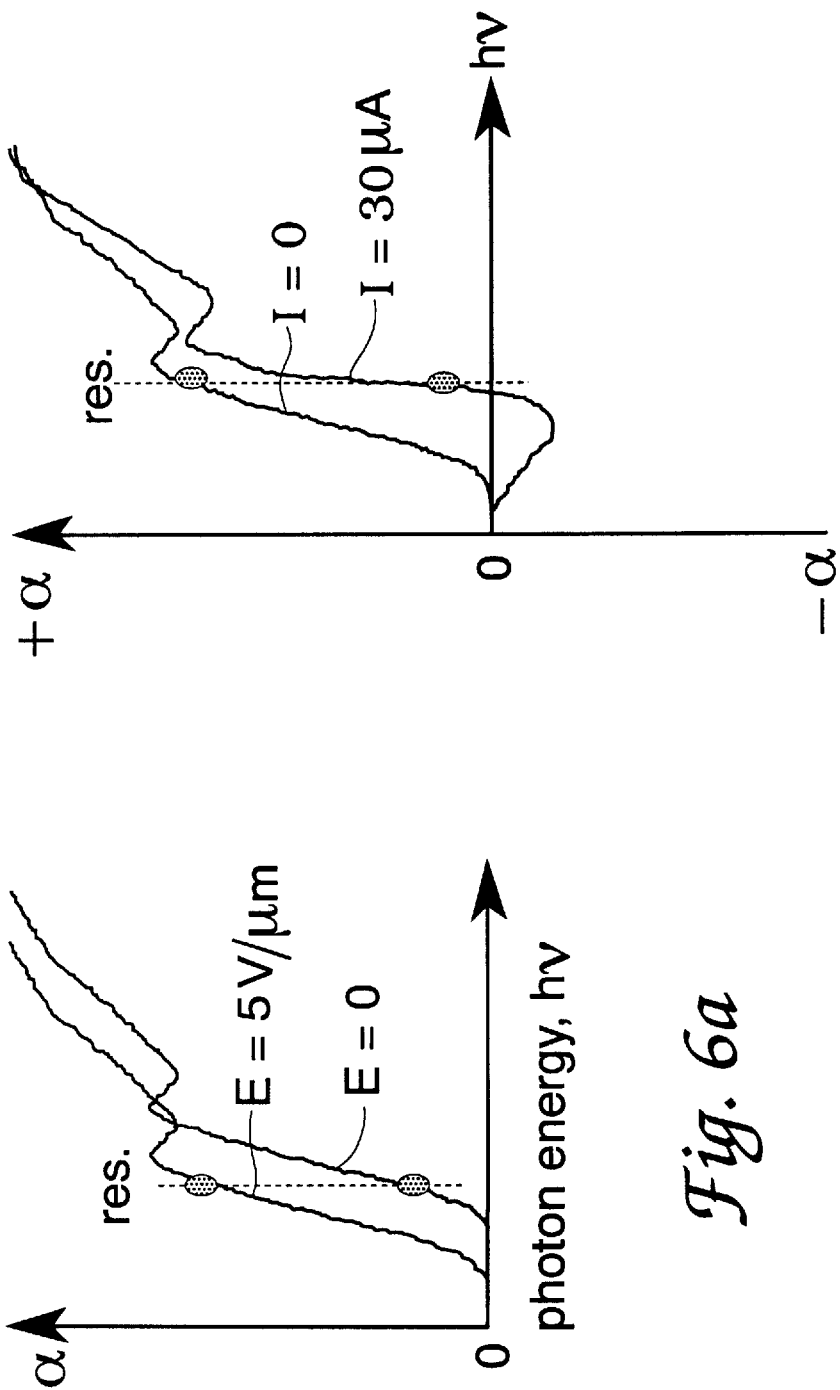
FIGS. 6a and 6b. Optical absorption v. photon energy for the ON and ON states of electroabsorptive and electrotransparent p-i-n quantum-well microresonator material.

In a schematic fashion, we have compared in FIG. 6 the absorption ($\alpha$) spectra of EA and ET microresonators. FIG. 6a shows the OFF and ON absorption spectra of III-V quantum-well p-i-n resonators for EA during E-field application. FIG. 6b shows the OFF and ON absorption, transparency, and gain spectra of the same quantum wells for ET during current injection. The dashed vertical line in FIG. 6a and in FIG. 6b shows the photon energy at which resonance occurs. The two dots on this vertical line represent the high-absorption and low-absorption states of the microresonators. The QW alloy composition and geometry can be "engineered" to give the desired high/low absorptions at a chosen resonance energy.

Figure 7A:
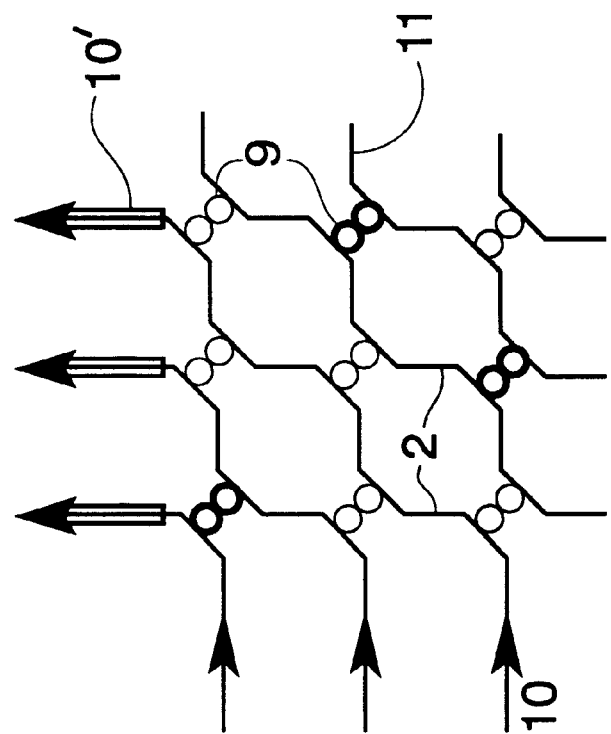
FIGS. 7a and 7b. Layout of addressed (a) electroabsorptive and (b) electrotransparent 3×3 crossbar matrix switches showing high- and low-absorption states of 2-ring resonators.
Figure 7B:
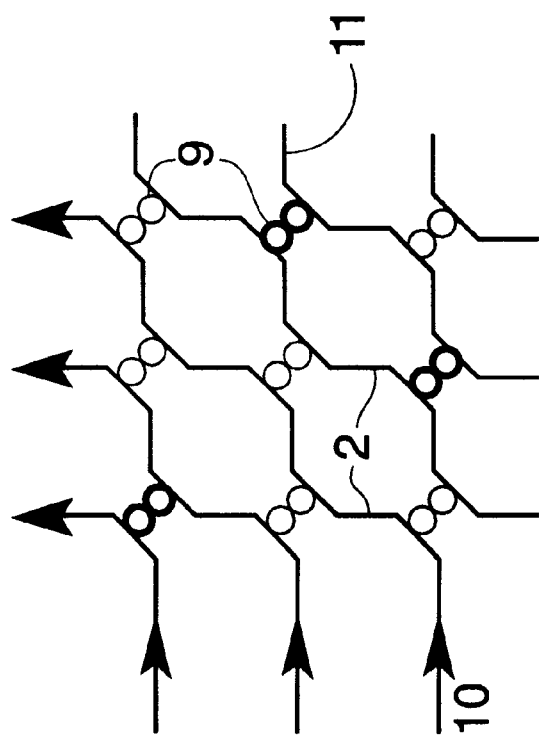

Now we shall compare in FIG. 7 the manner in which EA and ET crossbar switching is done. FIG. 7a for EA and FIG. 7b for ET show crossbar switching for an addressed 3×3 matrix which has a mapping 1-1, 2-3, and 3-2. The high-absorption condition of the dual microrings is indicated by the heavy circles in FIGS. 7a and 7b, and the optional optical amplifiers are indicated by heavy arrows 10' in FIG. 7b. Although FIGS. 7a and 7b appear similar, the two matrices operate differently because the high absorption is ON in FIG. 7a, while high absorption is OFF in FIG. 7b. Since most of the 2×2 switches must be in the low absorption state, a disadvantage of ET in FIG. 7b is that M$^2$−M=6 switches must be ON, a larger number than the M=3 required ON in the EA case of FIG. 7a. So, the drive requirements are higher in FIG. 7b. However, if the current requirement were 30 microamps per switch in FIG. 7b, then the total current in an 8×8×8 would be N(M$^2$−M)×30 micro-amps=8(64−8)×30 mA=13.4 mA, a modest requirement. Another issue for FIG. 7b, is amplified spontaneous emission noise, although such noise may not be severe because the matrix is operated below the gain threshold. As a final remark on ET, we note that the optical crosstalk and the optical insertion loss of the ET crossconnect will be identical to that of the EA crossconnect, although if the amplifiers 10' shown in FIG. 7b were employed, the ET crossconnect would have lower loss.

The final described embodiment of this invention is a low-crosstalk switch, FIGS. 8 and 9, made from III-V or II-V waveguides 2, or from Group IV waveguides such as silicon-on-insuluator (SOI). At first glance, the 2×2 crosspoints in FIG. 8, and the resulting M×M crossbar in FIG. 9, look similar to those in the recent work reported by G. A. Fish, L. A. Coldren, S. P. DenBaars (Electronics Letters, vol. 33, p. 22, 1997; see also Optical Fiber Conference, San Jose, Feb. 22, 1998) who employed III-V waveguides, a curved segment of biased III-V optical amplifier material connecting two arms extending from a waveguide crossover, and two suppressed mode interference (SMI) switches. However, inspection of our FIGS. 8 and 9 show that our crosspoints and crossbar are distinctly different from the prior-art Fish work because (1) our M×M contains no waveguide crossings, whereas his structure has $M^2$ crossings, and (2) we do not use any amplifiers, and instead, in each crosspoint we use a pair of electro-optical switches and a passive waveguide segment. We have eliminated the waveguide intersection in each 2×2 of Fish and have replaced it by a passive 2-microring resonator that crosses over only light signals, if applied thereto by electro-optic switches, that are resonant with those rings as per FIGS. 8a and 8b. FIG. 8a shows that both resonant signals cross over when both electrooptical (EO) switches 52 and 54 are OFF. FIG. 8b shows that the "east" resonant signal is in the bar state, and the "south" resonant signal is in the cross state when both EO switches are ON—although the "south" signal is never present in our crossbar matrix: hence the signal "exchange" of FIGS. 8a and 8b is sufficient in our matrix.

Figure 8B:
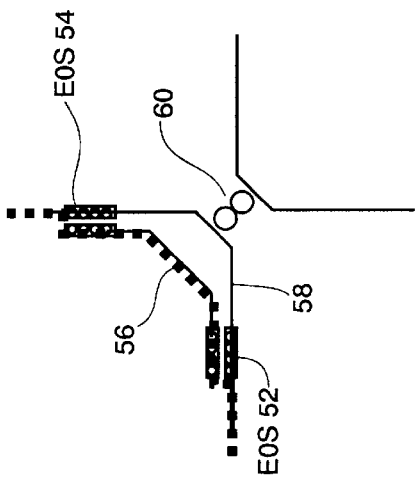
FIGS. 8a–8d. OFF and ON optical states of new passive-rings/EO-switch 2×2 crosspoint at resonant and non-resonant light wavelengths.
Figure 8D:
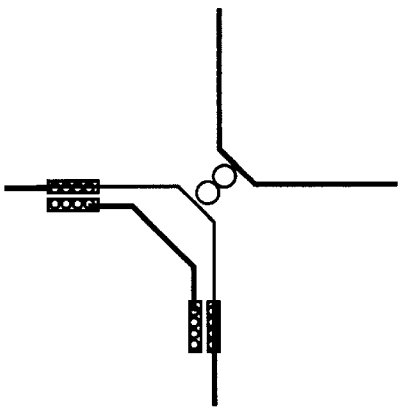
Figure 8A:
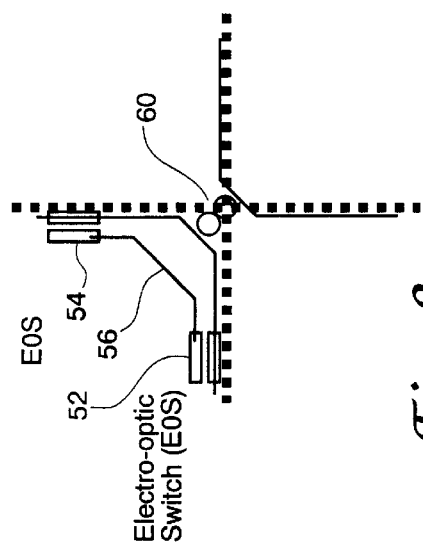
Figure 8C:
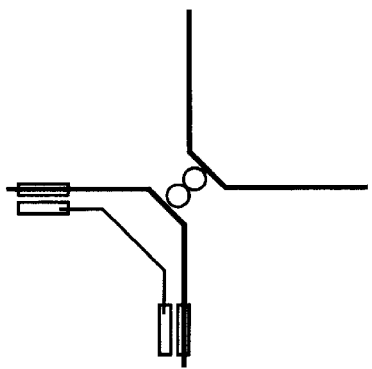

Thus this embodiment of the invention provides cascaded optical light transmissive switching matrices connected together in optical series as indicated in FIG. 9, each matrix including light-switching elements having passive microring resonators 60 associated with cross-points between non-intersecting light waveguide portions of the matrices, and active electro-optical switch means for applying incoming light signals to selected microrings or alternatively shunting incoming light signals around selected microrings. The electro-optic switch means can include a one-by-two EO sub-switch 52 coupled in series with a two-by-one EO sub-switch 54 via passive waveguide portion 56 at each cross-point. Two-by-two sub-switches could be employed to function in like manner. Hence, in the EO OFF state of FIG. 8a, the incoming signal would be applied to the passive resonator 60 via switch 52 and waveguide portion 58, and would cross-over through the rings but only if it has the resonant wavelength. In the EO ON state of FIG. 8b, the incoming signal would be shunted around the ring resonator 60, via 56, by switch 52 and thus cannot traverse the crosspoint through the rings. The passive microring resonators 60 of each matrix are responsive to a particular wavelength of light assigned to a particular matrix of the routing network and are unresponsive to wavelengths assigned to other matrices of the network. On the other hand, the EO switches are spectrally broadband and switch all N different -wavelength signals in the same manner. As illustrated in FIG. 8c for EO switches OFF and FIG. 8d for EO switches ON, the two non-resonant lightwave signals are always in the bar state as in the FIG. 3 embodiment. Thus, the FIG. 8 signal shunting manipulations are advantageously employed in the multiwavelength routing scheme of the invention. FIG. 9 illustrates how the FIG. 8 2×2's are connected into a 3×3 crossbar matrix resonant at $\lambda_1$. The optical paths followed by resonant and non resonant light signals in FIG. 9 are essentially the same as shown in our earlier 4×4 FIG. 3 employing diagonal paths for non-resonant light, and a series connection of FIG. -9 matrices indicated by block 50 can be made for an M×N×M crossconnect routing network. A unique feature or advantage of FIG. 9 is that a very low level of matrix crosstalk is achievable without any of the amplification used in Fish's matrix. Returning briefly to FIG. 8, the concepts that (1) compounding two EO switches reduces crosstalk, and (2) and the 50%-cross 50%-bar state of FIG. 8b is "crossbar adequate", were probably put forward first by Soref and Schissler in their 1977 U.S. Pat. No. 4,011,543.

As discussed, two electrooptic (EO) switches 52 and 54 are employed in each crosspoint. In III-V and II-VI material, these EOs would use either the Pockels effect, the quantum-confined Stark effect, or carrier-injected refraction change. There are three alternatives for the paired 1×2 and 2×1 switches. The first is the digital optical switch (DOS) also known as a mode evolution switch. The second is a pair of 2×2 directional coupler switches (DCS). The third is a pair of 1×2 and 2×1 SMIs. Both DOS and DCS use a change in refractive index for switching. Hence, what we have done in FIGS. 8 and 9 is to make the microrings passive and the EO index-changing devices active. Although the EO device width is similar to the ring diameter, the EO device length is unfortunately one to two orders longer than the ring diameter because it uses index changes rather than absorption changes. Hence the good switching in FIG. 9 comes at the expense of a larger chip area, but still circa 1 cm². Turning to the important case of bulk Group IV waveguides, such as Si or SiGe, here the free-carrier plasma effect, and the thermo-optic effect, are each strong enough to provide DOS or DCS over an active length of ~500 $\mu$m; thus silicon is well suited for FIG. 9. Moreover, the silicon chip area can be several cm² if desired. Hence we have a good way to build an M×N×M crossconnect in SOI.

To summarize, we have presented integrated-optic semiconductor chip architectures for complete M×N×M crossconnect switching in dense WDM network systems. Switching is based upon electroabsorptive or electrotransparent arrays of dual-microring/disk resonators. The compact planar switch is expected to operate at <5V with <1 ns reconfiguration times. Analysis reveals that our embodiment has very low crosstalk, and that a 16×16×16 crossconnect would have >48 dB SXR if the 2-ring OFF state absorption were reduced to 10 dB/cm. The insertion loss is probably the factor that limits scaling up M and N. Our calculations suggest an upper bound of 10.1 dB for fundamental loss in an 8×8×8 crossconnect for the 7% example. Since waveguide wall loss adds to the fundamental loss, and since waveguide loss is N-dependent (dependent upon the total length of the connecting waveguides), scaling the crossconnect from 8×8×8 to 16×16×16 might introduce unacceptable loss.

Since variations will occur to the skilled worker in the art, the scope of the invention is to be limited solely by the terms of the following claims and art recognized equivalents thereof. For example, the term "lightwave micro-resonator" includes the micro-rings and micro-disks described herein. This term also includes resonant lightwave responsive devices such as spheres, ellipsoids and other devices that can respond to light of a particular wavelength while discriminating against light of other wavelengths. The term "waveguide" includes optical fibers or similar light conduits.

What is claimed is:

1. A wavelength-division-multiplexed routing network comprising:

(a) a plurality of N cascaded optical matrix switches connected together in optical series, where N is an integer, each matrix switch including a number of light waveguides and an array of active micro-sized lightwave micro-resonator cross-point light-switching elements associated with cross-points between non-intersecting light waveguide portions, and wherein said light-switching elements of each matrix switch are responsive to a particular wavelength of light $\lambda_i$, where i=1 . . . N, assigned to a particular matrix of the N-wavelength routing network and are unresponsive to other wavelengths assigned to other matrices of the network; and (b) switching element control means for causing selected light-switching elements to assume a cross state for switching resonant light across associated cross-points, or a bar state for forwarding light without traversing cross-points.

2. The network of claim 1 wherein said cross-point light-switching elements comprise two-by-two cross-point switches.

3. The network of claim 2 wherein each cross-point switching element has an even number of coupled active lightwave micro-resonators and can assume an electrical ON state or an electrical OFF state under the control of said switching element control means.

4. The network of claim 1 wherein each matrix has M input and M output light waveguides, where M is an integer of four or more, and $M^2$ cross-point switches, and only M cross-point switches assume the electrical ON state at any one time.

5. The network of claim 2 wherein each matrix has M input and M output light waveguides, where M is an integer of four or more, and $M^2$ cross-point switches, and only M cross-point switches assume the electrical ON state at any one time.

6. The network of claim 3 wherein each matrix has M input and M output light waveguides, where M is an integer of four or more, and $M^2$ cross-point switches, and only about M cross-point switches assume the electrical ON state at any one time.

7. The network of claim 1 wherein each matrix has a group of output ports and preserves the spatial arrangement of incoming N-1 non-resonant signals at said output ports.

8. The network of claim 2 wherein each matrix has a group of output ports and preserves the spatial arrangement of incoming N-1 non-resonant signals at said output ports.

9. The network of claim 3 wherein each matrix has a group of output ports and preserves the spatial arrangement of incoming N-1 non-resonant signals at said output ports.

10. The network of claim 1 wherein said cross-point light-switching elements comprise semiconductor bulk-heterostructure or multiple-quantum-well electroabsorbtive resonators that have low optical absorption in the field-OFF state and high optical absorption in the field-ON state.

11. The network of claim 2 wherein said cross-point light-switching elements comprise semiconductor bulk-heterostructure or multiple-quantum-well electroabsorbtive resonators that have low optical absorption in the field-OFF state and high optical absorption in the field-ON state.

12. The network of claim 3 wherein said cross-point light-switching elements comprise semiconductor bulk-heterostructure or multiple-quantum-well electroabsorbtive resonators that have low optical absorption in the field-OFF state and high optical absorption in the field-ON state.

13. A wavelength-division-multiplexed routing network comprising:

(a) a plurality of cascaded optical matrix switches connected together in optical series, each matrix switch including a number of light waveguides and an array of lightwave micro-resonator cross-point light-switching elements associated with cross-points between non-intersecting light waveguide portions, and wherein said light-switching elements of each matrix switch are responsive to a particular wavelength of light assigned to a particular matrix of the routing network and are unresponsive to other wavelengths assigned to other matrices of the routing network; and (b) switching element control means for causing selected light-switching elements to assume a cross state for switching resonant light across associated cross-points, or a bar state for forwarding light without traversing cross-points.

14. The network of claim 13 wherein said cross-point switching elements comprise two-by-two cross-point switches.

15. The network of claim 13 wherein each cross-point switching element has an even number of coupled active lightwave micro-resonators and can assume an electrical ON state or an electrical OFF state under the control of said switching element control means.

16. The network of claim 14 wherein each cross-point switching element has an even number of coupled passive lightwave micro-resonators.

17. The network of claim 13 wherein each matrix has M input and M output light waveguides, where M is an integer of four or more, and $M^2$ cross-point switches.

18. The network of claim 13 wherein each matrix has a group of output ports and preserves the spatial arrangement of incoming non-resonant signals at said output ports.

19. The network of claim 13 wherein said cross-point light-switching elements comprise semiconductor bulk-heterostructure or multiple-quantum-well electrotransparent resonators that have high optical absorption in the injected-current-OFF state and low optical absorption in the injected-current-ON state.

20. The network of claim 14 wherein said cross-point light-switching elements comprise semiconductor bulk-heterostructure or multiple-quantum-well electrotransparent resonators that have high optical absorption in the injected-current-OFF state and low optical absorption in the injected-current-ON state.

21. A wavelength-division-multiplexed routing network comprising:

(a) at least one light signal routing matrix having a number of light waveguides and an array of lightwave micro-resonator light-switching elements associated with cross-points between non-intersecting light waveguide portions, and wherein said light-switching elements of each matrix are responsive to a particular wavelength of light and are not responsive to other wavelengths of light that may be assigned to other matrices of said routing network; and (b) switching element control means for causing selected light-switching elements to assume a cross state for switching resonant light across associated cross-points, or a bar state for forwarding light without traversing cross-points.

22. The network of claim 21 wherein said cross-point switching elements comprise two-by-two cross-point switches.

23. The network of claim 21 wherein each cross-point switching element has an even number of coupled active lightwave micro-resonators and can assume an electrical ON state or an electrical OFF state under the control of said switching element control means.

24. The network of claim 21 wherein each cross-point switching element has passive lightwave micro-resonators along with active electro-optic index changing switching means.

25. The network of claim 22 wherein each cross-point switching element has passive lightwave micro-resonators along with active electro-optic index-changing shunt switching means.

26. The network of claim 1 wherein each lightwave micro-resonator includes a p-i-n microdisk diode.

27. The network of claim 13 wherein each lightwave micro-resonator includes a p-i-n microdisk diode.

28. The network of claim 21 wherein each lightwave micro-resonator includes a p-i-n microdisk diode.

29. The network of claim 21 wherein each cross-point switching element has passive lightwave micro-resonators along with active electro-optic index-changing shunt switching means.

30. The network of claim 22 wherein each cross-point switching element has passive lightwave micro-resonators along with active electro-optic index changing shunt switching means.

31. The network of claim 21 wherein each matrix has M input and M output light waveguides, where M is an integer of four or more, and $M^2$ cross-point switches.

32. The network of claim 21 wherein each matrix has a group of output ports and preserves the spatial arrangement of incoming non-resonant signals at said output ports.

33. The network of claim 21 wherein said cross-point switching elements comprise semiconductor bulk-heterostructure or multiple-quantum-well electrotransparent micro-resonators that have low absorption in the electrical ON and OFF states.

34. A wavelength-division-multiplexed routing network comprising:
  (a) a plurality of cascaded optical light transmissive switching matrices connected together in optical series, each matrix including a number of light-switching elements, each light-switching element including passive lightwave micro-resonators associated with cross-points between non-intersecting light waveguide portions of said matrices, and electro-optical switch means for selectively applying incoming light signals to selected lightwave micro-resonators or alternatively, shunting incoming light signals around non-selected lightwave micro-resonators, and wherein said lightwave micro-resonators of each matrix are responsive to a particular wavelength of light assigned to a particular matrix of the routing network and are unresponsive to wavelengths assigned to other matrices of the network; and
  (b) switching element control means for controlling said electro-optic switch means for preventing application of incoming light signals to non-selected lightwave micro-resonators.

35. The network of claim 34 wherein said light-switching elements comprise two-by-two cross-point switches.

36. The network of claim 34 wherein each electro-optic switch means includes a one-by-two switch coupled in series with a two-by-one switch.

37. The network of claim 35 wherein each electro-optic switch means includes a one-by-two switch coupled in series with a two-by-one switch.

38. An optical switching matrix comprising:
  (a) a matrix including a number of light-switching elements including passive lightwave micro-resonators associated with cross-points between non-intersecting light waveguide portions of the matrix and electro-optical switch means for selectively applying incoming light signals to selected passive lightwave micro-resonators or alternatively, shunting incoming light signals around said selected passive lightwave micro-resonators; and
  (b) switching element control means for controlling said electro-optic switch means for preventing application of incoming light signals to non-selected micro-resonators.

39. The network of claim 38 wherein said light-switching elements comprise two-by-two cross-point switches.

40. The network of claim 38 wherein each two-by-two cross-point switch includes a one-by-two switch coupled in series with a two-by-one switch.

41. A wavelength-division-multiplexed routing network comprising:
  (a) a plurality of cascaded optical matrix switches connected together in optical series, each matrix including a number of light waveguides and an array of cross-point light-switching elements associated with cross-points between non-intersecting light waveguide portions, and wherein said light-switching elements of each array are responsive to a particular wavelength of light assigned to a particular matrix of the routing network and are unresponsive to other wavelengths assigned to other matrices of the routing network; and
  (b) switching element control means for causing selected light-switching elements to assume a cross state for switching light across associated cross-points, or a bar state for forwarding light without traversing cross-points.

42. The network of claim 41 wherein said cross-point switching elements comprise two-by-two cross-point switches.

43. The network of claim 1 wherein said lightwave micro-resonators comprise micro-rings.

44. The network of claim 13 wherein said lightwave micro-resonators comprise micro-rings.

45. The network of claim 21 wherein said lightwave micro-resonators comprise micro-rings.

46. The network of claim 34 wherein said lightwave micro-resonators comprise micro-rings.

47. The network of claim 38 wherein said lightwave micro-resonators comprise micro-rings.

* * * * *